(12) United States Patent
Kurian et al.

(10) Patent No.: US 10,978,078 B2
(45) Date of Patent: Apr. 13, 2021

(54) SYNTHESIZED VOICE AUTHENTICATION ENGINE

(71) Applicant: Bank of America Corporation, Charlotte, NC (US)

(72) Inventors: Manu Kurian, Dallas, TX (US); Karl W. Thomas, Orland, CA (US); Paul Grayson Roscoe, Charlotte, NC (US); Saritha Prasad Vrittamani, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/559,800

(22) Filed: Sep. 4, 2019

(65) Prior Publication Data
US 2019/0392841 A1    Dec. 26, 2019

Related U.S. Application Data

(63) Continuation of application No. 15/382,935, filed on Dec. 19, 2016, now Pat. No. 10,446,157.

(51) Int. Cl.
*G10L 13/00* (2006.01)
*G10L 21/00* (2013.01)
(Continued)

(52) U.S. Cl.
CPC ............ *G10L 17/02* (2013.01); *G10L 13/02* (2013.01); *G10L 13/00* (2013.01); *G10L 13/08* (2013.01);
(Continued)

(58) Field of Classification Search
None
See application file for complete search history.

(56) References Cited

U.S. PATENT DOCUMENTS

| 5,548,647 A | ‡ | 8/1996 | Naik | G10L 17/02 340/5 |
| 5,893,057 A | ‡ | 4/1999 | Fujimoto | G10L 17/00 704/24 |

(Continued)

*Primary Examiner* — Richard Z Zhu
(74) *Attorney, Agent, or Firm* — Banner & Witcoff, Ltd.; Michael A. Springs

(57) ABSTRACT

A system for creating a synthetic voice identifier may include a plurality of synthesized voice authorization (SVA) devices and a biometric combinatory device (BCD). The SVAs may be communicatively coupled to the BCD via a network and may communicate utilizing a markup language. The SVA devices may capture an audio signal of a voice of a user, modify the audio signal with a randomized audio frequency signal to generate a modified audio signal, and communicate, the modified audio signal as a synthesized voice signal associated with the user. The BCD may receive biometric information corresponding to a user, the biometric information comprising at least audio information associated with a voice of the user, receive, at an integration module, location information corresponding to a location of the user, combine, the location information and audio signal information associated with the user to generate a synthesized voice identifier associated with the user, and communicate the synthesized voice identifier to a remote device for use in an authentication process of the user.

20 Claims, 5 Drawing Sheets

(51) Int. Cl.
  *G10L 17/02* (2013.01)
  *G10L 13/02* (2013.01)
  *G10L 17/22* (2013.01)
  *G10L 17/20* (2013.01)
  *G10L 17/00* (2013.01)
  *G10L 13/08* (2013.01)
  *H04L 29/06* (2006.01)

(52) U.S. Cl.
  CPC .............. *G10L 17/00* (2013.01); *G10L 17/20* (2013.01); *G10L 17/22* (2013.01); *H04L 63/107* (2013.01)

(56) References Cited

U.S. PATENT DOCUMENTS

| | | | | |
|---|---|---|---|---|
| 6,952,774 B1 ‡ | 10/2005 | Kirovski | ........ | G11B 20/00086 382/100 |
| 7,362,884 B2 ‡ | 4/2008 | Willis | ............... | G06K 9/00892 340/5 |
| 7,379,872 B2 ‡ | 5/2008 | Cabezas | ................. | G06F 21/64 704/26 |
| 7,861,092 B2 * | 12/2010 | Wei | ......................... | G06F 21/32 380/255 |
| 7,987,092 B2 ‡ | 7/2011 | Cabezas | ................. | G06F 21/64 704/26 |
| 8,095,372 B2 ‡ | 1/2012 | Kuppuswamy | ........ | G10L 17/22 379/88 |
| 8,321,684 B2 ‡ | 11/2012 | Mumm | .................. | G10L 17/22 713/18 |
| 8,347,370 B2 ‡ | 1/2013 | Headley | ............... | H04L 9/3271 713/18 |
| 8,370,152 B2 ‡ | 2/2013 | Cabezas | ................. | G06F 21/64 704/26 |
| 8,701,199 B1 ‡ | 4/2014 | Dotan | .................... | H04L 63/08 726/25 |
| 8,977,260 B1 ‡ | 3/2015 | Choi | ..................... | H04W 12/12 455/410 |
| 9,166,977 B2 * | 10/2015 | Desai | ..................... | H04L 9/3247 |
| 9,183,836 B2 ‡ | 11/2015 | Daye | ....................... | G10L 17/04 |
| 9,336,782 B1 ‡ | 5/2016 | Patel | ..................... | G10L 13/033 |
| 9,418,673 B2 ‡ | 8/2016 | Cabezas | ................. | G06F 21/64 |
| 9,438,591 B2 ‡ | 9/2016 | Hama | ................ | G06K 9/00087 |
| 10,049,673 B2 * | 8/2018 | Kurian | ................... | G10L 17/02 |
| 2002/0072900 A1 ‡ | 6/2002 | Keough | ................ | G10L 13/033 704/220 |
| 2007/0036289 A1 ‡ | 2/2007 | Fu | ..................... | G07C 9/00158 379/88 |
| 2007/0055517 A1 ‡ | 3/2007 | Spector | ................... | G06F 21/32 704/24 |
| 2007/0185718 A1 ‡ | 8/2007 | Di Mambro | ............ | G06F 21/32 704/273 |
| 2008/0040262 A1 ‡ | 2/2008 | D K | ........................ | G06F 21/32 705/39 |
| 2009/0187405 A1 ‡ | 7/2009 | Bhogal | .................. | G10L 17/00 704/24 |
| 2009/0228271 A1 ‡ | 9/2009 | DeSimone | ............. | G10L 13/10 704/23 |
| 2012/0066704 A1 ‡ | 3/2012 | Agevik | ............. | G06F 17/30032 725/10 |
| 2012/0240195 A1 ‡ | 9/2012 | Weiss | .................. | H04L 63/0846 726/4 |
| 2014/0136652 A1 ‡ | 5/2014 | Narayanaswami | ..... | H04L 67/02 709/217 |
| 2014/0341440 A1 ‡ | 11/2014 | Walch | .................... | G06F 21/40 382/116 |
| 2016/0050234 A1 ‡ | 2/2016 | Choyi | .................... | G06F 21/32 726/1 |
| 2016/0087957 A1 ‡ | 3/2016 | Shah | ..................... | H04L 63/205 726/1 |
| 2016/0142405 A1 ‡ | 5/2016 | Deffeyes | ............. | H04L 63/0861 726/7 |

\* cited by examiner
‡ imported from a related application

SYNTHESIZED VOICE AUTHENTICATION ENGINE

CROSS REFERENCE TO RELATED APPLICATIONS

This application is continuation of and claims priority to U.S. application Ser. No. 15/382,935, filed Dec. 19, 2016, and entitled "Synthesized Voice Authentication Engine," which is incorporated hereby by referenced in its entirety.

FIELD OF THE INVENTION

Various aspects of the disclosure relate to voice authentication. More specifically, aspects of the disclosure relate to systems and methods for providing a synthesized voice signal for use for use by individuals in voice authentication for accessing secure locations and/or secure information. Additionally, this disclosure relates to analyzing voice and other biometric information, leveraging information determined through the data analysis to provide more secure authentication of users.

BACKGROUND OF THE INVENTION

Different systems and methods have been used to ensure proper authentication of individuals to prevent unauthorized access to secured physical locations and secured information storage locations. In some cases, different voice authentication techniques may be used to authenticate an individual attempting to access the secured location or information. In many cases, current technologies for securing locations and/or information mainly focus on use of character strings (e.g., a sequence of numbers, a sequence of alphanumeric characters, and the like), traditional voice authentication techniques, or a combination of both. However, traditional voice authentication techniques may not be effective for individuals with disabilities, or even individuals speaking a language foreign to the local geographic area in which the voice authentication security techniques have been implemented. Additionally, traditional voice authentication techniques may be overcome by use of a mimicked vocal pattern, a recorded vocal signal reciting an authorized pass code, and the like. As such, a need has been recognized to improve systems and methods for voice authentication that may be used by an organization to prevent access to secured locations or information by unauthorized individuals, leveraging voice and other biometric information.

SUMMARY OF THE INVENTION

Aspects of the disclosure provide effective, efficient, scalable, and convenient technical solutions that address and overcome the technical problems associated with voice authentication systems and methods used for preventing unauthorized access to physical locations and/or secured information. In particular, one or more aspects of the disclosure provide systems and techniques for managing access to data via a synthesized voice engine that provides a synthesized voice for use by individuals in voice authentication applications and a biometric combinatory device to combine biometric information with voice data and rotating frequencies to provide a personalized and secure voice profile.

A system for creating a synthetic voice identifier may include a plurality of synthesized voice authorization (SVA) devices and a biometric combinatory device (BCD). The SVAs may be communicatively coupled to the BCD via a network and may communicate utilizing a markup language. The SVA devices may capture an audio signal of a voice of a user, modify the audio signal with a randomized audio frequency signal to generate a modified audio signal, and communicate, the modified audio signal as a synthesized voice signal associated with the user. The BCD may receive biometric information corresponding to a user, the biometric information comprising at least audio information associated with a voice of the user, receive, at an integration module, location information corresponding to a location of the user, combine, the location information and audio signal information associated with the user to generate a synthesized voice identifier associated with the user, and communicate the synthesized voice identifier to a remote device for use in an authentication process of the user.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
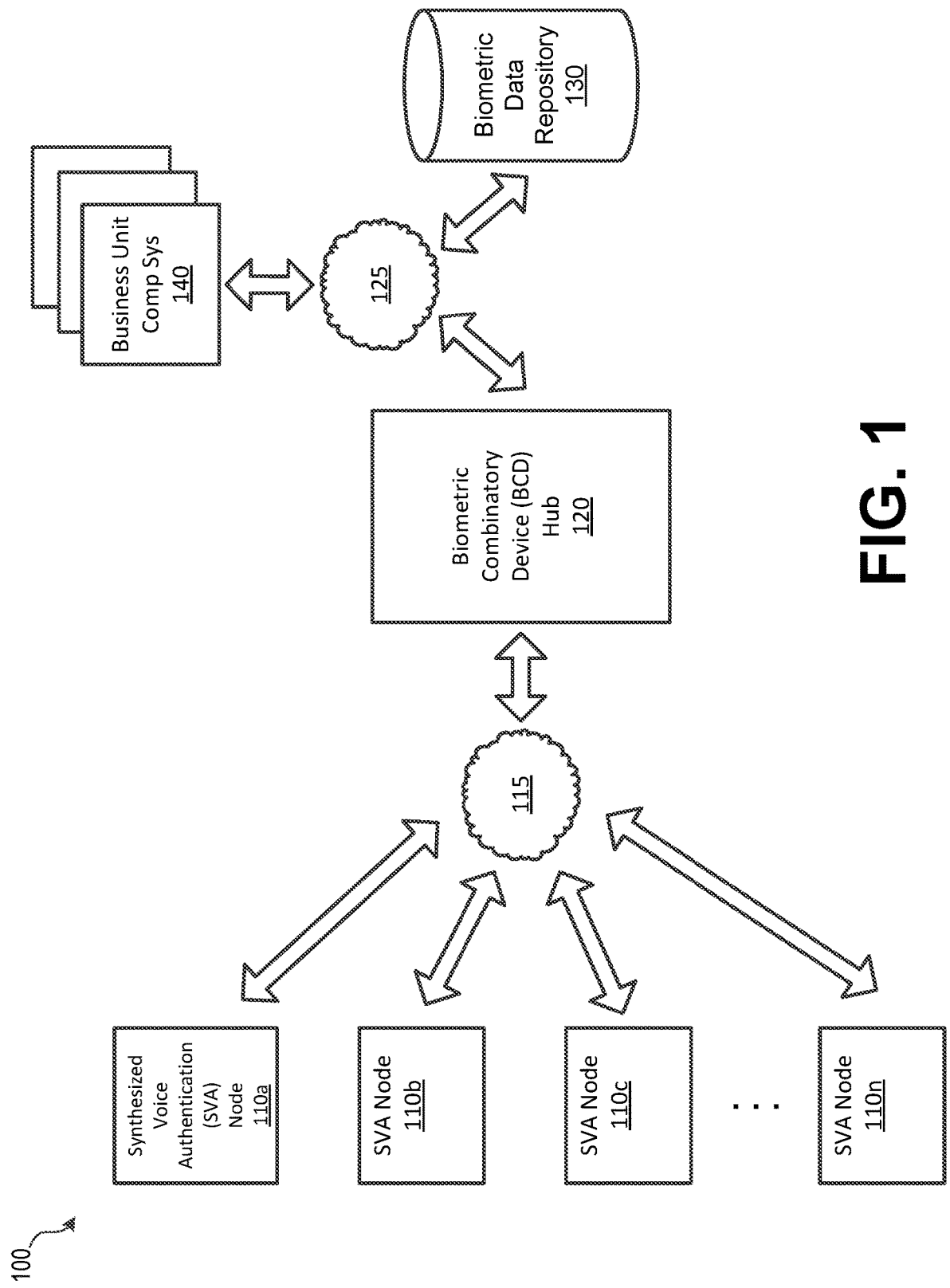
FIG. 1 shows an illustrative computing environment corresponding to a synthesized voice authentication system according to aspects of this disclosure.

FIG. 1 shows an illustrative computing environment corresponding to a synthesized voice authentication system 100 according to aspects of this disclosure. The synthesized voice authentication system 100 may include one or more synthesized voice authentication devices (e.g., SVA node 11*a*, SVA node 11*b*, SVA node 11*c*, SVA node 11*n*, and the like) communicatively coupled via one or more networks 115 to a biometric combinatory device (BCD) that may be centrally located as a hub coordinating operation of a plurality of SVA nodes. In some cases, the network 115 may comprise one or more communications networks (e.g., the Internet, a telecommunications network, a wide area network (WAN), a local area network (LAN), and the like). The biometric combinatory device 120 may be located on an organization's computing network (e.g., network 125 that may comprise one or more of a WAN, LAN, or the like) and may be communicatively coupled to a plurality of business unit computing systems 140 and/or a biometric data repository 130 securely storing biometric information received from one or more of the SVA nodes 110a-110n, the BCD device 120, and/or the one or more business unit computing systems 140. In some cases, the biometric data repository may comprise one or more data repositories storing biometric information that may be used as at least a portion of a user authorization and/or verification process. In some cases, the biometric data repository may be located at a central location (e.g., an enterprise data repository at a data center), distributed over a number of servers, local to a geographic region, and/or the like. In an illustrative example, the biometric data repository 130 may store biometric information such as synthesized voice authentication and verification information associated with a plurality of individuals, biometric information associated with the plurality of individuals including facial recognition information, natural voice information, fingerprint information, and the like. Such information, may be used with the synthesized voice authentication and verification information to provide a greater level of security, confidence and/or reliability that a received synthesized voice authentication request corresponds the intended user.

In some cases, the synthesized voice authentication system 100 may include one or more devices that may be considered to be computing system comprising an obfuscated voice authentication engine. The synthesized voice authentication system 100 may be used to in the transition from a standard voice authentication environment to a synthesized and/or hybrid voice authentication environment using a markup language. In some cases, the markup language may be an adaptable markup language, where patterns may be identified over time and incorporated into the markup language to ensure greater security from use of the synthesized voice identifier and/or ensure processing occurs with optimized efficiency, such as by leveraging machine learning and/or artificial intelligence techniques. In a traditional voice authentication system, a voice pattern may be identified based on an analysis of an audio sample of an individual's voice. For example, a person may speak into a microphone to capture a signal representative of that individual's voice, such as to capture a recording of a particular phrase or sound pattern. This captured signal may be processed and analyzed to create a record of a unique audio identifier that may be associated with the particular individual. However, such methods may be subject to potential attempts to improperly bypass any security measures using that audio identifier, such as by another person mimicking the individual's voice, using a captured recording of the individual speaking, and/or the like.

By using the devices of the synthesized voice authentication system 100, an institution (e.g., a financial institution, a government organization, an educational institution, or the like) may use one or more devices processing algorithms specifically coded to perform synthetic voice authentication procedures based on a particular profile. In some cases, the synthesized voice authentication devices 110a-100n may be used to generate a synthesized voice for the individual associated with each particular synthesized voice authentication device 110a-100n. In some cases, the synthesized voice authentication devices 110a-100n may allow individuals with disabilities (e.g., a sight impaired individual, a blind individual, an individual with a speech disability, and the like.) to generate a unique synthesized voice pattern for use in authenticating an identity of the associated individual who, in some cases, may not be able to easily take advantage of traditional voice authentication procedures. In some cases, individuals that cannot speak, or who have difficulties in speaking, can leverage the synthesized voice for one or more voice recognition purposes.

In some cases, the biometric combinatory device 120 may be used as a "trusted" engine for use as a validation point for the plurality of SVA nodes 110a-110n and may, upon proper validation of a synthesized voice, issue a specific value, token, or the like. Unlike traditional voice authentication methods, this system may also be leveraged for use with one or more different languages. In some cases, the synthesized voice authentication system 100 may be adapted to include and/or merge with the capabilities of one or more different authentication technologies, such as password protection and the like. In some cases, the synthesized voice authentication signal may be combined with traditional or adaptive encryption schemes on the different combinatory points, such as at a particular synthesized voice authentication node (e.g., the SVA node 110a or the like) to enhance security provided by using the synthesized voice authentication system 100. For example, the BCD 120 may receive a synthesized voice signal from the SVA node 110a corresponding to a user of the SVA node 110a. The BCD 120 may, or may further cause the SVA node 110a, to include additional user identification information (e.g., biometric information, password information, address information, geolocation information, and the like) that may be stored in the biometric data repository 130 and/or may be retrieved form one or more of the connected business unit computing systems 140. Such information, along with geolocation information of the SVA node, may be used to include an audio signal having a randomized frequency (e.g., at an audible frequency, at an inaudible frequency, and/or the like), along with at least a portion of the user's audio capture, in the generated synthesized voice signal.

In some cases, the SVA 110a may be configured to provide feedback regarding a status of a voice authentication process, to the user. In some cases, the SVA device 110a may include a visual indicator device, an audio indicator device, a text-based indicator, haptic feedback, and/or the like.

In some cases, the synthesized voice authentication system 100 may be used for one or more different network security purposes with respect to the organization providing this functionality. For example, the synthesized voice signal, the SVA nodes, the BCD 120 may be leveraged to enter secure locations in branches, offices, labs, and the like. In an illustrative example, the synthesized voice authentication system 100 may include Point-to-Point connection authentication, e.g., an application to beacon authorization process, as a functionality provided for with the use of the voice authentication signal. In such cases, an individual who has requested access to a system may have a synthesized voice signal based on an audio sample provided by the individual, examined to determine whether an existing profile has been identified in the system. In doing so, the synthesized voice authentication system 100 may increase the reliability of the security and verification procedures of the organization and may provide additional protection against individuals having one or more false profile by ensuring that a stored voice authentication profile may uniquely identify a user and eliminate, or at least minimize, exposure to falsely created profiles. In some cases, some or all of the generation of the synthesized voice signature may be generated on the SVA node 110a, the biometric combinatory device 120 or a combination of processing split between the devices. In some cases, the operation of the SVA 110a, the BCD 120 may be adapted due to operation of slow speed Internet devices and/or slow network connections.

Figure 2:
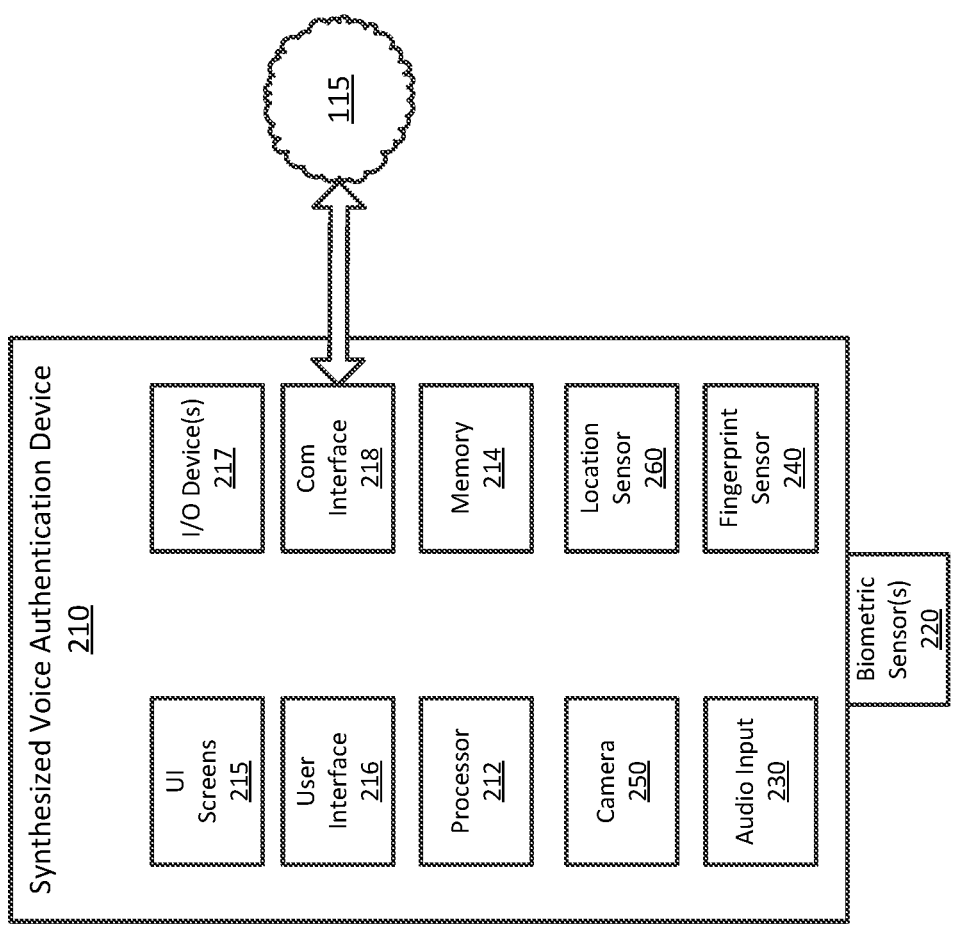
FIG. 2 shows an illustrative synthesized voice authentication (SVA) device according to aspects of this disclosure.

FIG. 2 shows an illustrative synthesized voice authentication (SVA) device 210, which may correspond to SVA device 110a, SVA device 110b, SVA device 110c, and SVA device 110d, according to aspects of this disclosure. The illustrative SVA device 210 may include a processor 212, a non-transitory memory device 214, a user interface device, a communications interface that may be used to communicatively couple the SVA device 210 to one or more networks (e.g., the network 115), and one or more input/output (I/O) devices 217. The SVA device 210 may also include one or more sensors for use in capturing or otherwise sensing biometric information of a user of the device 210. For example, the SVA device 210 may include one or more sensors within the device and one or more sensors externally connected to the SVA device 210, such as the biometric sensors 220 which may be communicatively coupled to the SVA device 210 via an I/O port. The SVA device 210 may further include one or more of an audio input 230 (e.g., a microphone), a fingerprint sensor 240, a camera 250 (e.g., a still camera, a video camera, and the like), a location sensor (e.g., a GPS device, a triangulation device such as a telecommunications modem, and the like).

In some cases, the SVA device 210 may be a stand-alone device dedicated to the function of generating a synthesized voice for an individual. In some cases, the SVD 210 may be implemented as an application and/or an application programming interface (API) interfacing with an application running on a personal device, such as a personal mobile device (e.g., a mobile phone, a wearable device, a smartwatch, and the like), a laptop computer, a desktop computer, a tablet device, and the like. In some cases, the SVA device 210 may be a stand-alone device, such as a self-service transaction device, an automated teller machine (ATM), a kiosk, or the like. In some cases, the SVA device may be an external hardware device that may plug into, or otherwise connect, with a personal computing device. For example, the SVA 210 may connect to a mobile phone, or other such device, as a "dongle" via a hardwired connection (e.g., a universal serial bus (USB) connection, a mini-USB connection, and the like) or via a wireless connection (e.g., a bluetooth connection, a WiFi, connection, a telecommunications network connection, an infrared (IR) communication link, and the like).

In some cases, the SVA device 210 may communicate, via the network 115 with the BCD device 120 using a defined communications protocol and/or a specified markup language to perform handshaking with the device, such that the SVA 210 may be used as an authentication device for the associated user. In some cases, an individual, may desire to use the SVA 210 to generate a synthesized voice identifier that may be used for data security and/or authentication purposes. In some cases, the individual may have a disability and may desire to use the synthesized voice identifier to allow use of the added security that the synthesized voice identifier offers. In some cases, the individual may desire to use the synthesized voice identifier to avoid a possibility of an improper impersonation used as an attempt at improper activity at the expense of the individual's credentials. By combining the user's voice signal with additional information that may be incorporated into the voice signal, and/or applied as an overlay over the user's voice signal as, for example, a "digital watermark". In doing so, the synthetic voice information may be used to avoid, and minimize the risk of effectiveness, of another person attempting use of mimicry, an impression, and/or vocal recordings in bypassing voice authentication measures to access private user information on a network, performing improper financial activity using the user's credentials, and/or the like.

In some cases, the user's voice signal may be captured using the audio input 230 and comprise a sample of the user speaking, such as speaking a particular word or phrase. The SVA may capture a geographic location using the location sensor 260 to identify a current location of the user and the SVA device 210. Additionally, the SVA device may capture additional biometric information using one or more biometric sensors, such as the fingerprint sensor 240, the camera 250, and other such sensor that may be capable of capturing biometric information. In some cases, the biometric information captured may be used in a user authentication procedure for allowing the user access to the SVA device. For example, the SVA device 210 may capture fingerprint information, retina scan information, facial recognition information with or without text information, or other user verification and/or passwords to facilitate user logon to the SVA device and/or an SVA application running on the SVA device 210. Once the user login has been verified, the user may be allowed access to one or more features and/or functionality of the SVA device, including creation and/or use of a synthetic voice identifier. In some cases, the SVA device may be configured to incorporate additional information into the captured user's voice signal to generate a unique synthetic voice identifier for the user. In some cases, the synthetic voice identifier may sound like a normal human voice to human ears. To accomplish this, additional audio information having a different audio frequency may be incorporated into the captured voice signal, that can be used as a "digital audio fingerprint" unique to a particular user. Such frequencies may be selected from a range of frequencies inaudible (e.g., a sub-audible range of frequencies and the like) to the human ear, and/or at power levels that may be heard by a human as being similar to "background" noise in relation the captured voice signal, if heard at all. For example, the synthesized voice identifier may not cause the user's voice to sound artificial (e.g., like a robot). Instead, signals at a desired power level and frequency may be added to the captured voice signal as a sub-audible frequency. However, these added frequencies may act as a digital "fingerprint" for the user's voice. In some cases, the signal overlay may be tracked on recording by storing an electronic code in the background.

Figure 3:
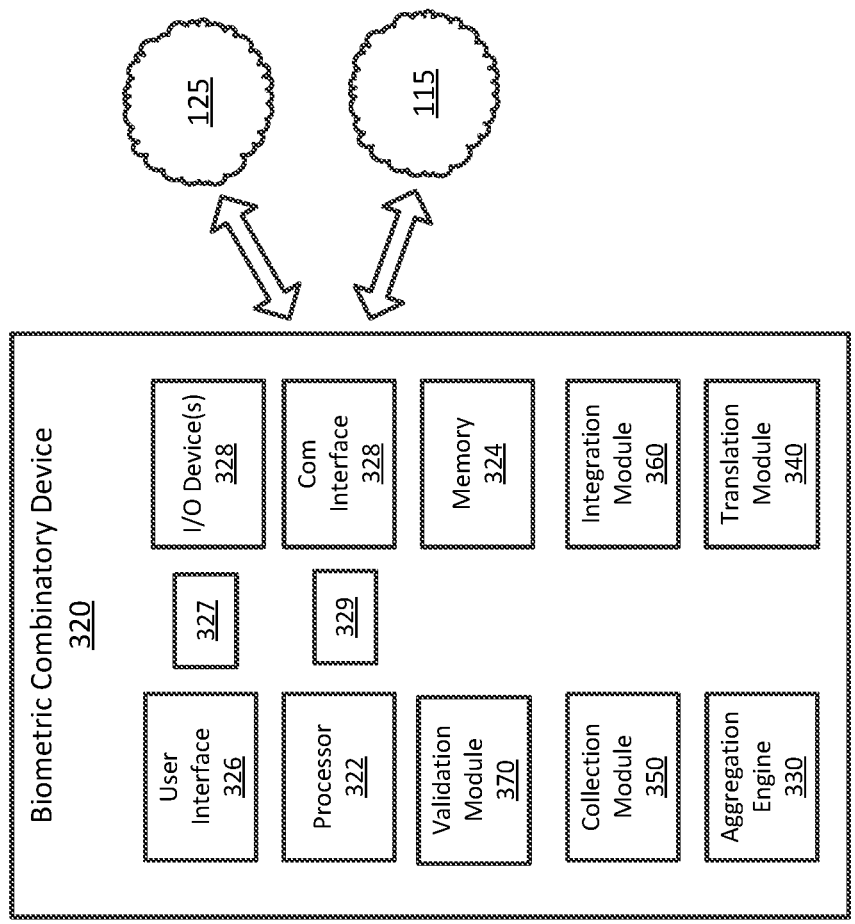
FIG. 3 shows an illustrative biometric combinatory device according to aspects of this disclosure.

FIG. 3 shows an illustrative biometric combinatory device 320 according to aspects of this disclosure. The BCD 320 may be a stand-alone server, a server cluster, and/or a distributed computer network. The BCD 320 may include a processor 322, a memory device 324, a communications interface 328, a user interface 326, one or more user interface screens 327, one or more I/O devices 327 (e.g., a stylus, a keyboard, a touchscreen, and the like), and a data repository that may be used to store synthesized voice identifiers associated with a plurality of the users. The data repository may include biometric information associated with each user. In some case, the BCD 320 may be communicatively coupled to the SVA nodes via the communication interface 328 and the network 115 and to the plurality of business unit computing systems 140 and one or more data repositories, such as the biometric information data repository 130. In some cases, the BCD 320 may include an API 329 that may be used to facilitate, with the SVA nodes 110a-n, synthetic voice identifier creation and use to authenticate a user's identity in a number of application on an organizations network. For example, the BCD may include one or more software modules including an aggregation engine 330, a translation module 340, a collection module 350, an integration module 360, and a validation module 370. In some cases, the BCD 320 may include a firewall to further isolate the BCD 320 form unwanted external incursion or interferences In some cases, the aggregation engine 330 may be implemented in one or more programming languages, such as C or an object-oriented programming language, such as JAVA, C++, or the like. The aggregation engine 330 may be a biometric information aggregation module of an API that aggregates, analyzes and/or reports biometric activities for the business organization network with a markup language. In some cases, the aggregation engine 330 may process zoned or un-zoned data analytics in collecting biometric information from one or more devices active on the network (e.g., the SVA 210), from one or more business unit computing systems 140, and/or may retrieve or store biometric information in the biometric information data repository 130, such as by using one or more API functionality. The aggregation engine 330 may also be implemented as "middleware" to allow different applications running on the organization's computing systems to leverage biometric and synthetic voice identifier information in their user authentication procedures. For example, the BCD 320 may be implemented on a central server at a data center, where one or more of the business unit computing systems 140 may send or receive a synthetic voice identifier for verification as part of a user authentication procedure. In an illustrative example, the synthetic voice identifier information may be stored in a block chain configuration for each user, to allow for data segmentation and managing the user information with respect to one or more different access profiles. In some cases, the aggregation engine 330 may be configured to analyze received voice information to translate to or from different languages, a text to speech format, a speech to text format, and the like. For example, by using parametric text to speech technologies, the aggregation engine 330 may be capable of isolating and transforming components with a speech data element. The aggregation engine 330 may also perform compression via a number of lossless data compression methods, such as a Lempel-Ziv compression method, to minimize an amount of data transferred when using the biometric information (e.g., synthetic voice identifier, fingerprint information, retina scan information, and the like) for user authentication, while losing minimal data resolution, when communicating the biometric information between network components, such as SVA nodes, data repositories, business unit computing systems and the like.

In some cases, the aggregation engine 330 may exchange data in near real time with the SVA nodes, the business unit computing systems 140 and/or the biometric information data repository 130. In addition to biometric information (e.g., voice information, synthetic voice information, retinal scan information, facial recognition information, fingerprint information, and the like), the aggregation engine may also communicate associated information such as a user name, user identifier, a user address, a connection identifier, a geographic location associated with the user, and the like. In an illustrative application, a business unit computing system may leverage fingerprint information when a user requests certain actions, such as opening a large account across borders. In such cases, transactions such as these may face increased scrutiny to avoid and disprove suspicious or improper activities by persons not authorized to take such actions. Certain biometric identifiers may be used for authentication purposes, such as for fingerprint verification. However, these authentication purposes may be circumvented in some cases, such as, by utilizing a synthetic voice identifier that may include additional frequency components randomly generated based on the authorized user's information (e.g., a known location of the user, fingerprint data of the user, and the like), the opportunities for improper activity to succeed are minimized if not eliminated in most cases.

The aggregation engine 330 of the biometric combinatory device 320 may be implemented in a server and utilize a markup language for communication and translation, in near real-time, of real-time and/or historical biometric information to different system components via a server-based or web-based application interface. In some cases, the translation module 340 be used to adapt interpreted language for use in application-to-application functionality, including during initial handshaking. The translation module 340 may also be used to facilitate data analytics based on structured presentation, via a markup language, specifically tailored for use in communicating biometric and/or synthesized voice information associated with users. In some cases, biometric information, such as the synthesized voice information, may be enhanced with additional data that may be associated with a same user and stored in the biometric data repository 130 and/or other data repositories. Additionally, the markup language (e.g., a proprietary markup language, and the like) may be configured to support multiple languages with single and/or multiple byte translation to reduce problems that may arise based on multi-language access. In some cases, this support may include translation of information in a first language to corresponding information in a second language.

In some cases, the translation module 340 may be configured to support single byte input/output data and/or double byte input/output data. In an illustrative example, the translation module 340 may use a proprietary markup language to provide a nuanced application for synthesized voice recognition, authentication, and verification applications. The markup language may be used to facilitate storage and/or retrieval of biometric information, including synthesized voice information in an organized manner. For example, the markup language may be used to format storage and communication of combined biometric and user information including identifier information (e.g., user identifier, user name, time, date, geographic location, network location, device identifier, phone number, address, email address, and the like). Additional markup language entries may correspond to a type or combination of types of biometric information used, including natural voice information, synthesized voice information, fingerprint information, retina scan information, facial recognition information, and/or the like. Biometric data communicated may be defined in the markup language as whether the biometric data is being transferred in a compressed or uncompressed format. The markup language may also define a location in the communication packets at which the biometric data can be read (e.g., a data container), including handshaking and control words, status words, data container size and/or length, packet count, checksum, and/or the like. In some cases, the markup language may have an entry corresponding to whether the biometric information is historical information, real-time (or near real-time information), or the like. In some cases, the markup-language may be used to define one or more security methods and/or protocols that may be used in the communication of the biometric information.

In some cases, the biometric combinatory device 320 may include an integration module 360 for use in integrating additional information (e.g., biometric information, rotating frequency information, geolocation information, and the like) with a natural voice signal to generate a synthesized voice authentication identifier for each of a plurality of users. In some cases, the integration module may perform the integration functionality at a central location (e.g., at a BCD device server, and the like), at distributed locations (e.g., at one or more regional BCD device servers based on geolocation information, business unit information and the like), and/or at remote locations, such as at an SVA node 210. In an illustrative example, the integration module 360 may be configured to receive a voice signal associated with a user and additional information corresponding to the user. In some cases, an SVA node may capture a voice signal (e.g., in response to a user input) associated with a user and may communicate the captured voice signal to the BCD device 320 with additional information including one or more of a user name, user identifier, a geographic location associated with the use (e.g., a current location, a residence location, and the like), a device identifier of the SVA node, capturing the information, and the like). The integration module may then determine a randomized frequency for inclusion with the captured natural voice signal based on at least the additional information received from the SVA node 210 and/or user associated information (e.g., user fingerprint biometric information, user retina scan biometric information, and the like) retrieved from a data repository, such as the biometric information data repository 130. In an illustrative example, a randomized frequency may be obtained using a number returned from one of a pseudo-random number generator or a true random number generator, where a seed number may correspond to one of a base frequency in a sub-audible range and/or a number associated with biometric information, geolocation information, and/or the like. In an illustrative user verification application, a true random number generator may be used, based on a geolocation of the user device. For example, a latitude value, a longitude value, an address number associated with a latitude and longitude value received from the SVA node 210 may be used to calculate a true random number to be used in determining the frequency and/or amplitude of an additional signal to enhance the natural voice signal to generate a synthesized voice signal associated with the user. For example, the random number Rnum may be generated by the formula Rnum=RND(GeoVal), where RND( ) is a true random number generator function and GeoVal is a value associated with the geolocation of the user, such as a latitude, a longitude, a value combining the latitude and longitude of the users location, and/or the like. To determine the frequency, this random number may be used as a variable in a frequency determination function. For example, the frequency F may be determined using a formula, such as F=Fbase*(Rnum.*a), where Fbase is a predetermined sub-audible frequency, Rnum is the calculated random number and a is a scalar value for scaling the random number to ensure F remains within a predetermined range. Please note that the equations are shown for illustrative purposes and other such formulas and/or equations may be used.

In many situations, the frequency determination may be done a single time for a communications session. In some cases, a rotating frequency may be used by the integration module 360, where the rotating frequency may be determined at a first time associated with a user action, such as when a user attempts to log into an account. In some cases, such as during communications requiring a higher security level, the rotating frequency may change during the duration of the communications while the user is logged into the account. In some cases, the changing of the rotating frequency may be done during a session as a checkpoint during the session to ensure a same individual that logged into the account is participating in the session.

In some cases, a collection module 350 may be configured to collect input processed by the BCD 320. For example, the collection module 350 may identify a user and/or a business unit associated with the input data and aggregate the data associated with each user and/or business unit individually. In some cases, the collection module may be customized by a user or administrator to generate a report for use internally by the organization, reporting to a central agency, and/or reporting to a government agency when laws, rules and/or regulation require reporting profile based data. In some cases, the collection module may be used to log off each synthesized voice activity for auditing, non-repeating check and other compliance directives.

In an illustrative example, the components of the synthesized voice authentication system 100 may be used to create and user synthesized voice information for authentication and verification processes to help guarantee data security and/or minimize suspicious and improper activity associated with user accounts. The SVA nodes 110a-110n and the BCD 120 may, with additional information provided by the biometric data repository 130 and/or the business unit computing systems 140, may be used to generate a synthesized voice for one or more users. In some cases, the SVA 110 may capture a user's voice in an audio clip and the additional information may be encoded into the audio clip, such as by creating a digital audio watermark, to create a unique identification for a particular user. In some cases, data may be encoded in real time or near real-time. In cases of suspected suspicious activity and/or improper activity, the synthesized voice identifier used by a user may be analyzed, such as by the BCD 120, to verify the user's identity and or validate the authentication information. In an illustrative example, an individual may attempt to set up a large (e.g., greater than $100,000) commercial loan. The synthesized voice identifier provided by the user may be analyzed by the BCD 120 to ensure that the synthesized voice identifier has not already been associated with another individual. If so, the transaction and/or user may be identified for further examination and/or may be reported to local law enforcement for investigation. In some cases, real-time vocal events may be communicated in near real-time to ensure a same individual has continued in the transaction. Such audio communications may be recorded and stored for a predetermined time period. In this way, audio signals may be used to ensure a unique individual is associated with a unique synthesized voice identifier, even those who normally due to disabilities or other reasons, are not capable of using traditional voice recognition techniques. In some cases, a synthesized voice identifier may be paired with other biometric identifiers to ensure greater security, such as by using retina scan information, facial recognition information, fingerprint information and/or the like.

Figure 4:
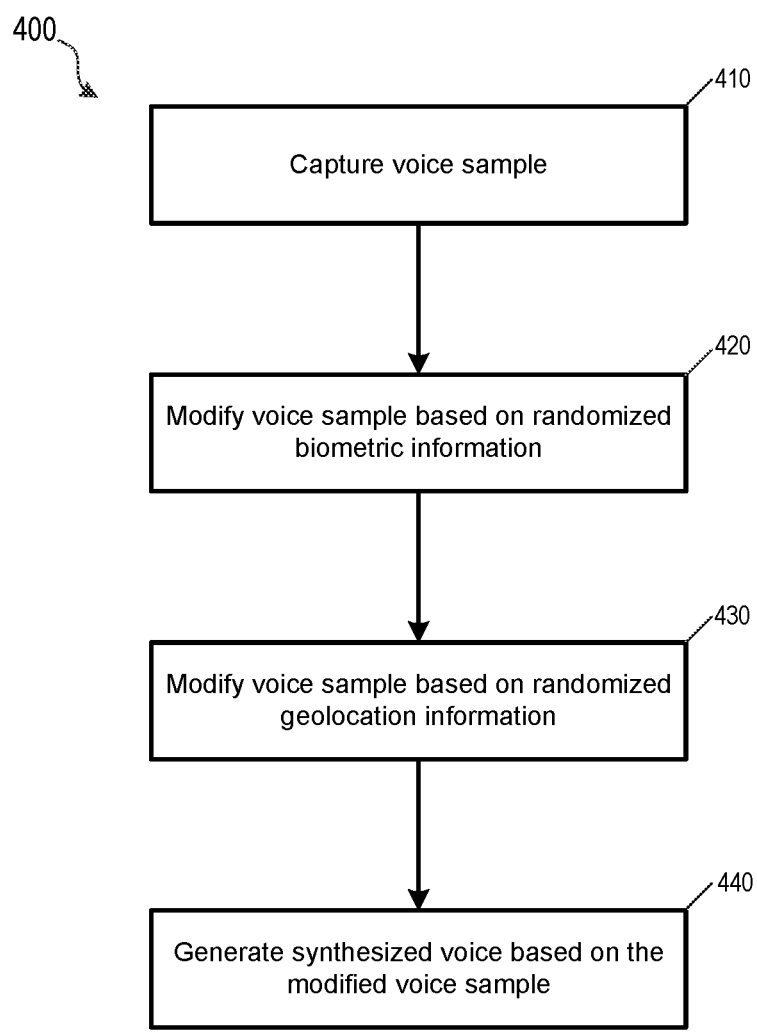
FIG. 4 shows an illustrative method for generating a synthesized voice authentication signal according to aspects of this disclosure.

FIG. 4 shows an illustrative method 400 for generating a synthesized voice authentication signal according to aspects of this disclosure. At 410 a synthetic voice authorization (SVA) device, such as the SVA nodes 110 of FIG. 1 may be configured to capture an audio signal of a voice of the user of the SVA device. In some cases, the SVA device 110 may capture a real-time, or near real-time, voice signal. In some cases, the SVA device 110 may capture a recorded audio signal, such as an audio clip or sample having a set duration. In some cases, the SVA node may capture the audio signal in response to an input received via an input device at the SVA node 110. In some cases, the SVA node may receive a request to capture an audio input signal from the user in response to a request received via the network 115, based on the user attempting to an activity requiring authentication of user credentials and/or secure data handling based on the requested activity. In some cases, at least a portion of the audio sample may be saved in a data repository local to the SVA node 110 and/or at a centralized data repository, such as the data repository 130.

At 420, the captured audio signal may be modified based on randomized biometric information in response to additional information captured and associated with the user. In some cases, the SVA node, when capturing an audio sample of the user, may capture other information, such as location information (e.g., a geographic location of the user and/or the SVA device 110 capture using the location sensor 260), biometric information (e.g., a retinal scan and/or a facial recognition scan using the camera 250, fingerprint information captured using the fingerprint sensor 240 and/or the like. In some cases, the SVA device 110 may analyze at least a portion of the captured information locally and/or may communicate the captured information via the network 115 to the biometric combinatory device 120 for analysis and/or modification. In some cases, the geolocation information, the biometric information and/or other information may be analyzed and used in calculations to generate information used to modify the captured audio signal (e.g., a natural voice signal). In some cases, the BCD 120 may analyze geolocation information to generate a randomized frequency or combination of frequencies, to be included in or superimposed upon the natural voice signal. In such cases, the randomized frequency may be inaudible to humans and may provide little to no distortion to the natural voice signal, but may be found based on, for example, a frequency analysis performed on the synthesized voice signal. In some cases, the SVA 110 may process the information locally to generate the "audio watermark" to be superimposed on the audio signal. In some cases, the BCD device may process the information at a central location and communicate the determined digital watermark to the SVA 110 for inclusion into the audio watermark in the synthesized voice identifier associated with that particular user. In some cases, such as for individuals with disabilities and/or difficulty with speaking, the audio sample may be machine generated audio, or in some cases, a modified text to speech format.

At 430, the SVA 110 may use the audio watermark to modify the captured voice signal to generate a synthesized voice signal associated with the user. The SVA 110 may superimpose the audio watermark, or other such frequency based signal, onto the captured voice signal. In some cases, the audio watermark may be based on geolocation information, or other such user related information.

At 440, the SVA 110 may generate a synthesized voice identifier, for use by the user, based on the combined audio watermark and the captured audio signal. In some cases, the SVA 110 may generate the synthesized voice identifier based, at least in part, on geolocation information captured by the SVA device, and/or other such information (e.g., biometric information and the like).

Figure 5:
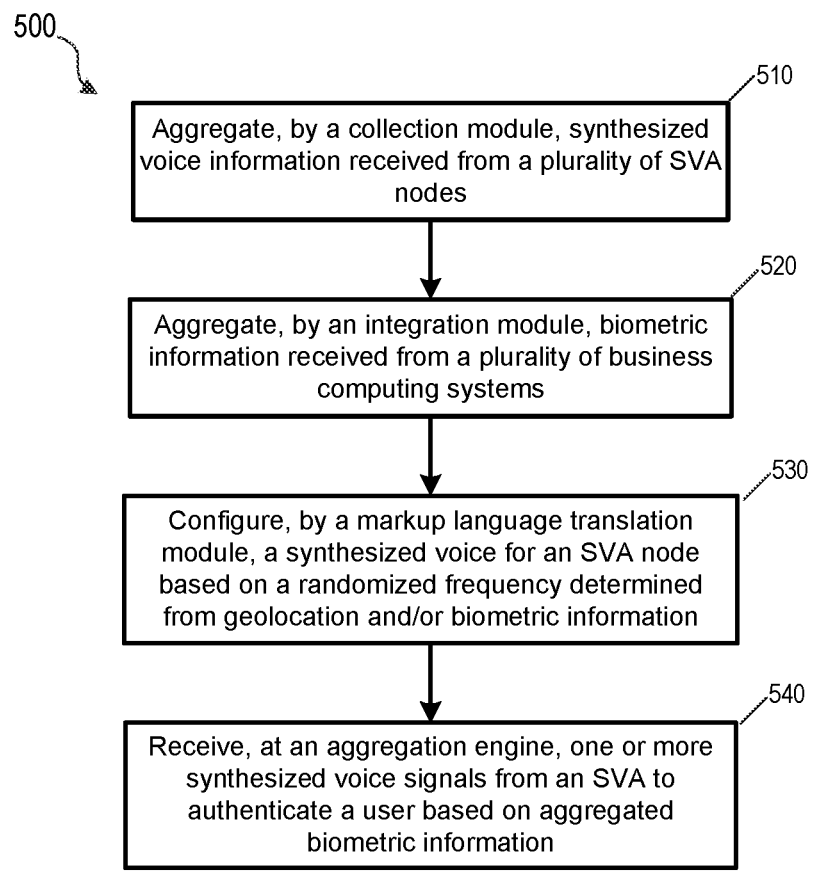
FIG. 5 shows an illustrative method for aggregating and analyzing biometric and synthesized voice authentication signals according to aspects of this disclosure.

FIG. 5 shows an illustrative method 500 for aggregating and analyzing biometric and synthesized voice authentication signals according to aspects of this disclosure. At 510, a collection module of the BCD 120 may aggregate synthesized voice information from a plurality of SVA nodes, wherein each synthesized voice identifier is associated with a particular user. At 520, an integration module may aggregate biometric information and/or geographic information associated with each particular user from a plurality of sources including the VCA 110, biometric information data repositories, and/or business unit computing systems. At 530, a markup language translation module may configure a synthesized voice signal for an SVA node based on a randomized frequency determined from geolocation information and/or biometric information and receive at an aggregation engine, one or more synthesized voice signals from a plurality of SVA nodes, in response to a user request for accessing secured information and/or to perform an action requiring proper authentication.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system comprising:
    a biometric combinatory device, comprising:
        a first processor; and
        a non-transitory memory storing first instructions that, when executed by the processor, cause the biometric combinatory device to:
            receive, at a collection module from a synthesized voice authentication device, geographic location information and biometric information associated with a user, wherein the geographic location information corresponds to a geographic location of the user captured by a location sensor of the synthesized voice authentication device and the biometric information comprises an audio clip of a voice of the user captured during an authentication request;
            generate a synthesized voice identifier associated with the user as a combination of a randomized audio frequency signal based on the geographic location information and the audio clip; and
            communicate, via a network connection, the randomized audio frequency signal to the synthesized voice authentication device; and
    the synthesized voice authentication device comprising:
        a second processor; and
        a non-transitory memory storing second instructions, that when executed by the second processor, cause the synthesized voice authentication device to:
            capture an audio signal of a voice of the user;
            generate a synthesized voice identifier associated with the user based on the audio signal and the randomized audio frequency signal; and
            communicate, to a remote device, the synthesized voice identifier during a user authentication process.

2. The system of claim 1, comprising
    the remote device, wherein the remote device stores non-public information corresponding to an activity requested by the user; and
    wherein the second instructions, when executed by the second processor, cause the synthesized voice authentication device to:
        receive, from the remote device, a request for authentication of a current user, wherein the synthesized voice identifier is communicated based on the request for authentication of the current user.

3. The system of claim 1, wherein the audio signal is captured as the user speaks a particular sound pattern.

4. The system of claim 1, wherein the audio signal is captured as a recorded audio clip.

5. The system of claim 1, wherein the synthesized voice authentication device comprises a geolocation device and wherein the second instructions when executed by the second processor, cause the synthesized voice authentication device to:
    capture, by the geolocation device, geolocation information concurrently with capturing the audio signal.

6. The system of claim 1, wherein the synthesized voice authentication device comprises a personal mobile device operating a synthetic voice authorization application.

7. The system of claim 1, wherein the biometric combinatory device comprises a centrally located computing system communicatively coupled to a plurality of remote computing systems running applications receiving the synthesized voice identifier for use in an authentication process.

8. The system of claim 1, wherein the synthesized voice authentication device comprises a personal mobile device including an input port and a hardware device operating a synthetic voice authorization application plugged into the input port.

9. The system of claim 1, wherein the second instructions, when executed by the second processor, cause the synthesized voice authentication device to:
    capture, via an input device, a text signal corresponding to a text to speech signal associated with the user; and
    generate, based on the text to speech signal, the audio signal of the voice of the user as a machine-generated audio signal.

10. The system of claim 1, wherein the randomized audio frequency signal comprises a signal at a frequency within a sub-audible range.

11. The system of claim 1, wherein communication of the synthesized voice identifier includes multi-language support.

12. A method comprising:
    receiving, by a biometric combinatory device, geographic location information, an audio clip of a user, and biometric information captured by a device associated with the user;
    generating a randomized audio frequency signal based on the geographic location information, the audio clip, and the biometric information;
    communicating, via a network connection, the randomized audio frequency signal to a synthesized voice authentication device;
    generating, by a synthesized voice authentication device, a synthesized voice identifier associated with the user based on a captured audio signal and the randomized audio frequency signal, wherein the audio signal comprises a voice of the user captured by the synthesized voice authentication device; and
    sending, to a remote device, the synthesized voice identifier during a user authentication process.

13. The method of claim 12, wherein the audio signal is captured by the synthesized voice authentication device and wherein the user authentication process comprises multi-language support.

14. The method of claim 12, wherein the randomized audio frequency signal comprises a signal at a frequency within a sub-audible range.

15. The method of claim 12, comprising:
    capturing, via an input device, a text entered by the user; and
    generating, based on the text, the audio signal as a machine-generated voice audio signal.

16. The method of claim 12, wherein the synthesized voice authentication device comprises a user device including an input port and a hardware device operating a synthetic voice authorization application plugged into the input port.

17. The method of claim 12, wherein the synthesized voice authentication device comprises a personal mobile device operating a synthetic voice authorization application.

18. The method of claim 12, wherein the biometric combinatory device comprises a centrally located computing system communicatively coupled to a plurality of remote computing systems running applications receiving the synthesized voice identifier for use in an authentication process.

19. The method of claim 12, comprising:
capturing the geographic location information and the biometric information concurrently with the audio signal.

20. The method of claim 12, wherein the audio signal is captured as the user speaks a particular sound pattern.

* * * * *